United States Patent [19]

Ahn

[11] Patent Number: 5,978,924
[45] Date of Patent: Nov. 2, 1999

[54] COMPUTER SYSTEM WITH AN ADVANCED POWER SAVING FUNCTION AND AN OPERATING METHOD THEREFOR

[75] Inventor: Hee-Geol Ahn, Suwon, Rep. of Korea

[73] Assignee: SamSung Electronics Co., Ltd, Kyungki-do, Rep. of Korea

[21] Appl. No.: 09/022,630

[22] Filed: Feb. 12, 1998

[30] Foreign Application Priority Data

Feb. 12, 1997 [KR] Rep. of Korea .......................... 97-4055

[51] Int. Cl.⁶ ...................................................... G06F 1/32
[52] U.S. Cl. ............................................................. 713/323
[58] Field of Search .................................... 713/320, 323, 713/300, 324, 340

[56] References Cited

U.S. PATENT DOCUMENTS

| | | |
|---|---|---|
| 3,801,963 | 4/1974 | Chen . |
| 4,763,333 | 8/1988 | Byrd . |
| 5,018,148 | 5/1991 | Patel et al. . |
| 5,021,983 | 6/1991 | Nguyen et al. . |
| 5,204,963 | 4/1993 | Noya et al. . |
| 5,396,637 | 3/1995 | Harwell et al. . |
| 5,414,861 | 5/1995 | Horning . |
| 5,485,623 | 1/1996 | Kurokawa et al. . |
| 5,548,763 | 8/1996 | Combs et al. . |
| 5,560,023 | 9/1996 | Crump et al. . |
| 5,638,541 | 6/1997 | Sadashivaiah . |
| 5,708,820 | 1/1998 | Park et al. . |
| 5,758,174 | 5/1998 | Crump et al. ............................ 713/323 |

*Primary Examiner*—Glenn A. Auve
*Attorney, Agent, or Firm*—Robert E. Bushnell, Esq.

[57] ABSTRACT

A computer system with power saving function and a method for operating the computer system whose maloperation or halt is capable of being prevented during system management interrupt (SMI) forpower saving operation, comprises a central processing unit determining whether or not a resume operation is performed; storing, if the resume operation is performed, a present time as a resume starting time; performing the resume operation; determining, by the central processing unit, whether or not a SMI request signal for performing a power saving operation is generated so as to store a plurality of register information of the computer system in an auxiliary storage device; determining, if the SMI request signal is generated, whether the power saving operation can be performed with referring to the stored resume starting time; storing, if the power saving operation can be performed, the plurality of register information in the auxiliary storage device and setting a completion flag in a CMOS memory upon completion of storing the plurality of register information in the auxiliary storage device; and the SMI request signal is cleared so as not to perform a SMI process routine even though an additional SMI request signal is generated when the additional SMI request signal is generated prior to the elapse of a preset time.

21 Claims, 4 Drawing Sheets

COMPUTER SYSTEM WITH AN ADVANCED POWER SAVING FUNCTION AND AN OPERATING METHOD THEREFOR

CLAIM OF PRIORITY

This application makes reference to, incorporates the same herein, and claims all benefits accruing under 35 U.S.C §119 from an application entitled A Method For Operating A Computer System With Power Saving Function earlier filed in the Korean Industrial Property Office on Feb. 12, 1997, and there duly assigned Ser. No. 97-4055 by that Office.

BACKGROUND OF THE INVENTION

1. Field of the Invention

The present invention relates to a method for operating a computer system with power saving function, and more particularly to a method for operating a computer system whose maloperation or halt is capable of being prevented during system management interrupt (SMI) for power saving operation.

2. Background of Related Art

At present, most computer systems have a power saving function so as to reduce power consumption thereof. Generally, power supplies for display apparatus such as cathode ray tube (CRT) display monitor apparatuses commonly used with computer systems are designed to provide the necessary voltages and currents within the desired specifications using internal control. As for a video display apparatus, typically, the power supply system thereof is provided with a power-off circuit for interrupting the electrical power supply to the display apparatus during a power off state.

In a video display apparatus having audio circuitry, video power savings for video circuitry are achieved by display power management signaling (DPMS) control recommended by video electronics standard association (VESA). It is well known that the DPMS power supply modes may be classified into a normal mode, a standby mode, a suspend mode and a power-off mode. During a normal operation mode (or full on mode) of the power management, all subsystems, such as an HDD (hard disk drive), a monitor and the like, are fully powered an the microprocessor chip is then operating at full speed. The computer systems remain in this state as long as it detects activity or if the power management controller has been at a disable state. If the computer system is not used for a predetermined amount of time, the power management controller is changed to a stand-by-mode. In this state the microprocessor clip is set to the lowest speed of low frequency possible and the power management controller is put into a reduced power state. The system continually monitors the wake-up activities from subsystems, such as a keyboard, a mouse, a communication port or an application program during this mode. This, in this state the power consumption can be largely reduced. During a suspend mode, all of the devices including the memory contents are saved to a separate disk portion and the entire computer is turned off. In this state, the contents are saved indefinitely until the computer system is resumed by hitting the power on button. Other than off, this mode is the lowest power state and is fixed to suspend to disk. For example, even a DC voltage is not applied to the microprocessor chip, and a DC voltage is not supplied to the most of the subsystems with the exception of subsystems necessary for restoring them to a normal operation mode. Finally, in case of a power off mode, the computer system is powered off so that the operation thereof is halted. See, for example, U.S. Pat. No. 5,548,763 for Desk Top Computer System Having Multi-Level Power Management issued to James L. Combs et al.

Herein, a "power saving function" means that most components of a computer system are halted to minimize power consumption, when the computer system is not used for a preset time, or when the computer system is operated with a battery mounted therein and the battery voltage is less than a preset voltage level. A "SAVE_TO_DISK" function is one of several ways that are used to perform a power saving function, e.g., a suspend operation in computer systems. The "SAVE_TO_DISK" function means that, when a computer system is not used more than a preset time, or when a specific key is pressed by a user, presently processing data and status information of the computer system are automatically saved in an auxiliary storage device, i.e., a hard disk and then the computer system is completely or partially powered off.

Generally, a computer system is broadly provided with a power supply, a microcomputer for functioning as a power supply controller, a CPU (central processing unit), a bus, a BIOS (basic input/output system) storage memory, a main memory consisting of RAM (random access memory), and an auxiliary memory consisting of a hard disk, etc.

The power supply distributes power from an AC adapter or a battery to respective components of the computer system. The microcomputer is provided to control the power supply in response to a power-on signal from a power-on switch and enable power from the power supply to be supplied to the respective components of the computer system. The microcomputer is also provided to control the power supply so as to enable the supply of power to the respective components to be shut down after the completion of the SAVE_TO_DISK operation. Namely, the microcomputer generates an SMI (system management interrupt) request signal which is to manage the computer system. The SMI request signal includes interrupt signals which are generated to perform power management of the computer system.

Next, the CPU detects the SMI request signal and performs an SMI process routine which is stored in the BIOS storage memory. If the SMI request signal is detected as a control signal used to perform the SAVE_TO_DISK operation, all the status information that has been set in the computer system are saved in the auxiliary memory. After this operation, the microcomputer controls the power supply so as to enable minimal power necessary for minimal operation of the computer system to be supplied.

On the other hand, if a power-on switch is at an ON state after the completion of the SAVE_TO_DISK operation, a resume operation is performed so the computer system can be recovered to a normal state in the below-mentioned manner.

The microcomputer controls the power supply to enable the supply of power to be supplied again from the power supply to the computer system. A POST (power-on-self-test) routine stored in the BIOS storage memory is then performed. At this time, it is determined whether or not the resume operation is needed. If the resume operation is needed, the resume operation is then performed. When the resume operation is completely finished, the computer system is recovered to an operational state prior to the SAVE_TO_DISK operation.

Conventional systems for computers having a data recovering function in the event of a power failure are illustrated, for example, see U.S. Pat. No. 5,708,820 for Network Hibernation System For Suspending And Resuming Operation Of Computer System Operable In Network Environment In Event Of Power Failure Or Period Of inactivity issued to Noh-Byong Park et al., U.S. Pat. No. 5,485,623 for Information Processor having High Speed And Safety Resume system issued to Yoshiki Kurokawa et al., U.S. Pat. No. 5,414,861 for Data Protection System Using Different Levels Of Reserve Power To Maintain Data In Volatile Memories For Any Period Of Time issued to Randall Horning, U.S. Pat. No. 5,396,637 for Data Processing System With Power-Fail Protected Memory Module issued to John C. Harwell et al., U.S. Pat. No. 5,204,963 for Method And Apparatus For A Backup Power Controller for Volatile Random Access Memory issued to Eric S. Noya et al., U.S. Pat. No. 5,018,148 for Method And Apparatus For Power Failure Protection issued to Rameah U. Patel et al., U.S. Pat. No. 4,763,333 for Work-Saving System For Preventing Loss In A Computer Due To Power Interruption issued to Kerry Byrd, and U.S. Pat. No. 3,801,963 for Method and Apparatus For Transferring Data From A Volatile Data Store Upon The Occurrence Of A Power Failure In A Computer issued to Kun-Chao C. Chen. These systems usually include a memory transfer device for transferring data stored in a volatile memory into a non-volatile memory (i.e., a memory that is capable of retaining data without power) upon a power termination or a power failure so that, when power is restored, a data refreshing device could transfer the data from the non-volatile memory back into the volatile memory and thereby restoring the computer to its exact state before the power failure, right down to the cursor position on the screen.

Separately, conventional systems for computers having a power saving function are illustrated, for example, in U.S. Pat. No. 5,021,983 for Suspend/Resume Apparatus And Method For Reducing Power Consumption In Battery Powered Computers issued to Au H. Nguyen et al. This system, for example, allows the user to turn off the computer during any period of non-use and to subsequently resume operation of the computer to exactly the same place before the shutdown.

Recently, computer operating systems utilizing an APM (advanced power management) function is on an increasing trend. See, for example, U.S. Pat. No. 5,638,541 for System And Method For Managing Power On Desktop System issued to Shivaprasad Sadashivaiah and U.S. Pat. No. 5,560,023 for Automatic Backup System For Advance Power Management issued to Dwayne T. Crump et al. The APM function is defined as a kind of power saving function that even operation systems (OS) can reduce power consumption in accordance with operational states of the computer system. In a computer system having an OS with APM function loaded therein, when a resume operation is performed after the SAVE_TO$_{13}$ DISK operation, a resume operation stored in the BIOS storage memory is performed and then a resume function implemented in the loaded OS is performed. It is known in this art that it takes the computer system about 30 seconds to perform the resume operation related to the OS.

However, when a SMI request signal for SAVE_TO_DISK operation is generated during the OS-related resume operation, the computer system is halted or not normally operated because the OS-related resume operation is not completely finished.

SUMMARY OF THE INVENTION

It is, therefore, an object of the invention to provide a computer system with a power saving function in which a resume operation is completed before permitting a SAVE_TO_DISK operation It is another object of the invention to provide a computer system with a power saving function which responds to the generation of a SMI request signal for SAVE_TO_DISK operation to perform the SAVE_TO_DISK operation only when a resume operation is completely finished.

It is yet another object of the invention to provide a computer system having an advance power management function supported by a n operating system thereof with a power saving function in which, when a SMI request signal for a SAVE_TO_DISK operation is generated during any operation other than aresume operation, the SAVE_TO_DISK operation can be normally perrformed.

It is yet another object of the invention to provide a computer system having an advance power management function supported by an operating system there of with a power saving function in which, when a SMI request signal for a SAVE_TO_DISK operation is generated during a resume operation, the SMI request signal is ignored so that the resume operation can be normally completed.

To achieve these objects and in accordance with the purpose of the invention, as embodied and broadly described herein, and according to an aspect of the present invention, a method for operating a computer system with power saving function is provided to prevent maloperation or halt of the computer system during system management interrupt (SMI) for a power saving operation. The method for operating the computer system comprises determining whether or not a resume operation is performed; storing, if the resume operation is performed, a present time as a resume starting time; performing the resume operation; determining whether or not a SMI request signal for performing a power saving operation is generated so as to store a plurality of register information of the computer system to an auxiliary storage device; determining, if the SMI request signal is generated, determining whether the power saving operation can be performed with reference to the stored resume starting time; storing, if the power saving operation can be performed, the plurality of register information to the auxiliary storage device; and clearing the SMI request signal so as not to perform a SMI process routine even though an additional SMI request signal is generated.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
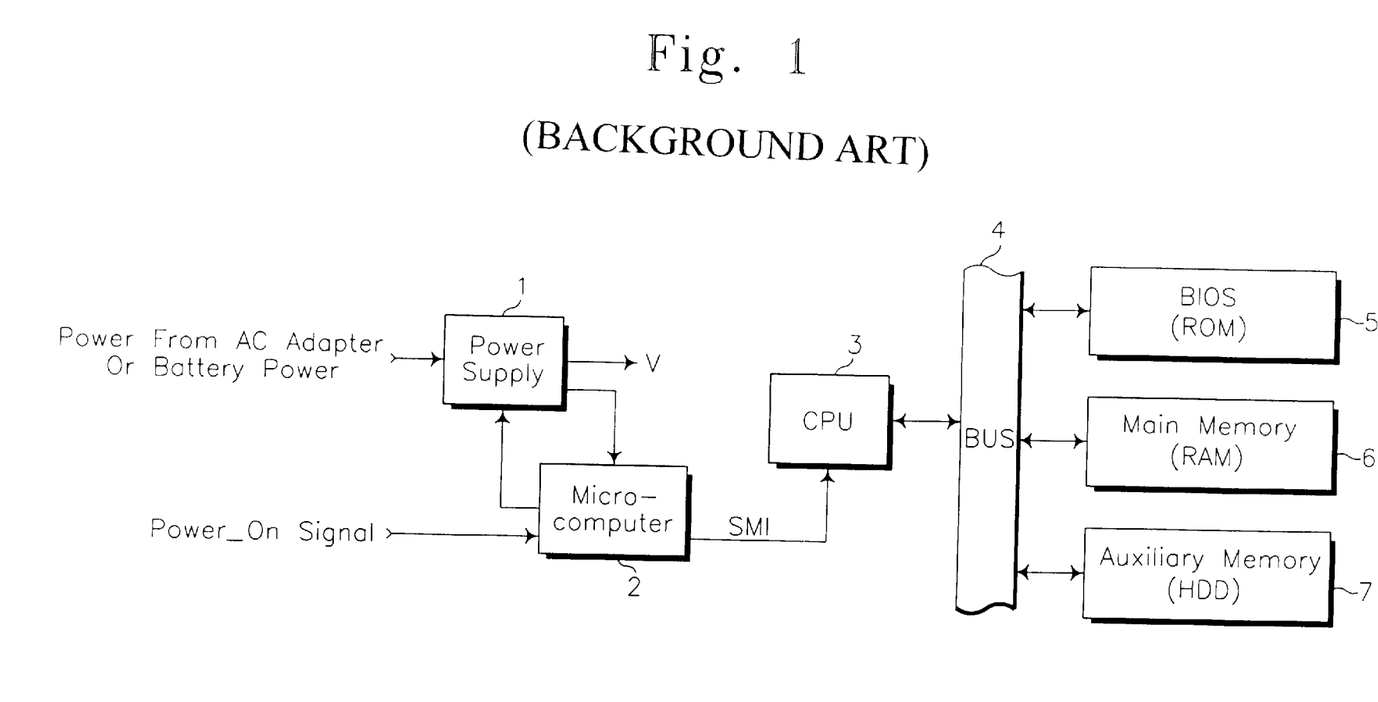
FIG. 1 is a block diagram showing a configuration of a hypothetical exemplary computer system.

FIG. 1 shows a configuration of a hypothetical exemplary computer system. In FIG. 1, the computer system is broadly provided with a power supply 1, a microcomputer 2 for functioning as a power supply controller, a CPU (central processing unit) 3, a bus 4, a BIOS (basic input/output system) storage memory 5, a main memory 6 consisting of a RAM (random access memory), and an auxiliary memory 7 consisting of a hard disk in a hard disk drive.

Power supply 1 distributes power from an AC adapter or a battery to respective components of the computer system. Microcomputer 2 is provided to control power supply 1 in response to a power-on signal from a power-on switch (not shown) and enable power from the power supply 1 to be supplied to the respective components of the computer system. Microcomputer 2 is also provided to control power supply 1 so as to enable the supply of power to the respective components to be shut down after the completion of a SAVE_TO_DISK operation. Namely, microcomputer 2 generates an SMI (system management interrupt) request signal which is used to manage the computer system. The SMI request signal includes interrupt signals which are generated to perform power management of the computer system.

Next, CPU 3 detects the SMI request signal and performs an SMI process routine which is stored in BIOS storage memory 5. If the SMI request signal is detected as a control signal used to perform the SAVE_TO_DISK operation, all the status information that was set in the computer system are saved in auxiliary memory 7. After this operation, microcomputer 2 controls power supply 1 so as to enable minimal power necessary for minimal operation of the computer system to be supplied.

On the other hand, if a power-on switch is in an ON position after the completion of the SAVE_TO_DISK operation, a resume operation is performed and so the computer system can be recovered to a normal state in the below-mentioned manner.

Microcomputer 2 controls power supply 1 to enable the supply of power to be supplied again from the power supply to the components of the computer system. A POST (power-on-self-test) routine stored in BIOS storage memory 5 is then performed. At this time, it is determined whether or not the resume operation is needed. If the resume operation is needed, the resume operation is then performed. When the resume operation is completely finished, the computer system is recovered to an operational state prior to the SAVE_TO_DISK operation.

Figure 2:
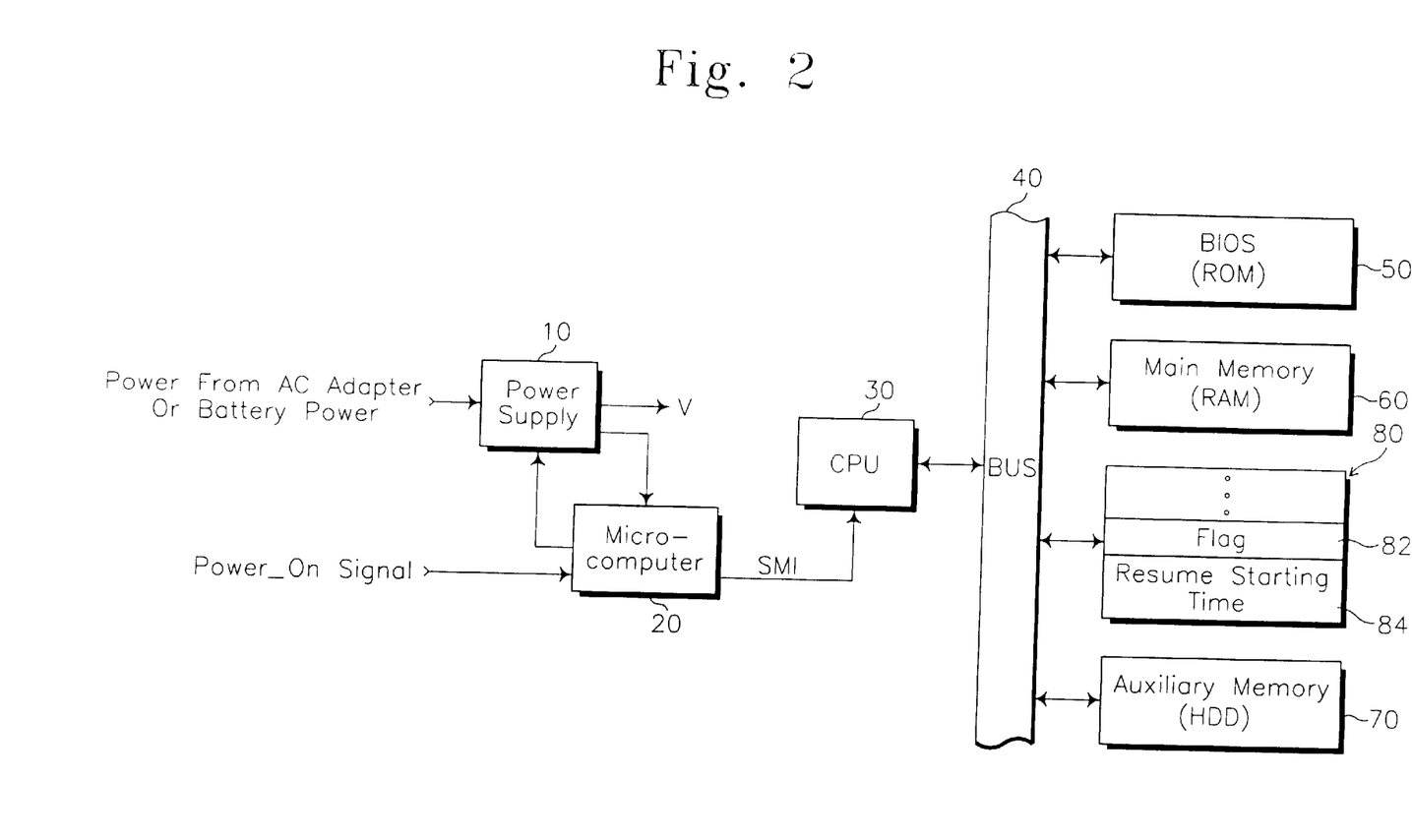
FIG. 2 is a block diagram showing a configuration of a computer system according to the present invention.

Referring to FIG. 2, a novel computer system in accordance with an embodiment of the present invention comprises a power supply 10, a microcomputer 20 for functioning as a power supply controller, a CPU 30, a system bus 40, a BIOS storage memory 50, a main memory 60, an auxiliary storage device 70 and a CMOS memory 80. CMOS memory 80 includes a flag storage region 82 which is used to determine whether or not a SAVE_TO_DISK operation is completely performed, and a resume time storage region 84 for storing information related to a resume starting time indicating when a resume operation starts. In this embodiment, all the flag storage region 82 and the resume time storage region 84 are located in the CMOS memory 80 which stores several information of the computer system by set-up. Herein, a power saving function, particularly, a suspend mode operation is called a "SAVE_TO_DISK" operation for convenient description. In this embodiment, the SAVE_TO_DISK operation includes a step wherein presently processing data and status information of the computer system are automatically saved in main memory 60 and in auxiliary storage device 70, i.e., a hard disk.

Figure 3:
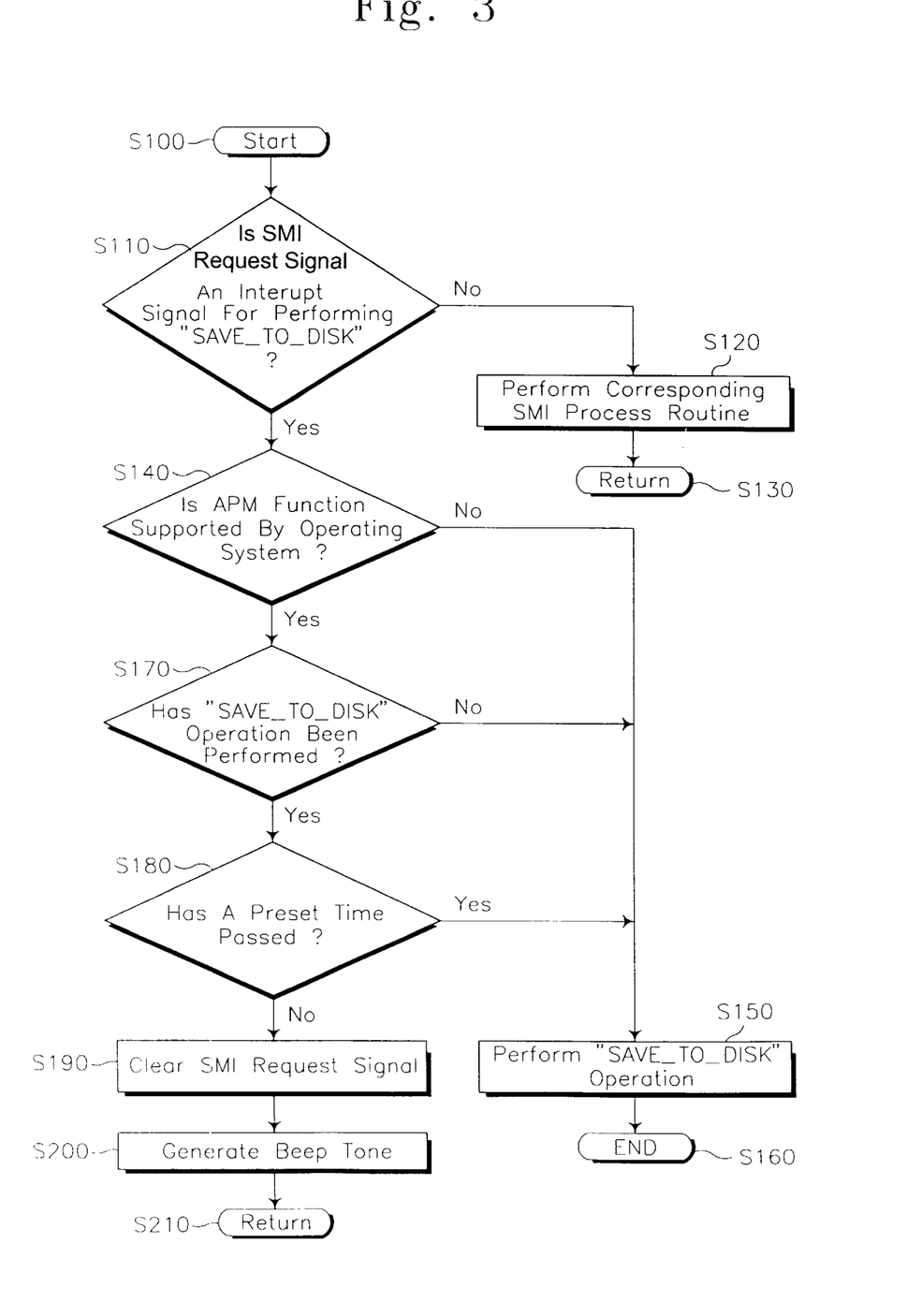
FIG. 3 is a flow chart showing control process steps of a SAVE_TO_DISK operation in the a computer system of FIG. 2.
Figure 4:
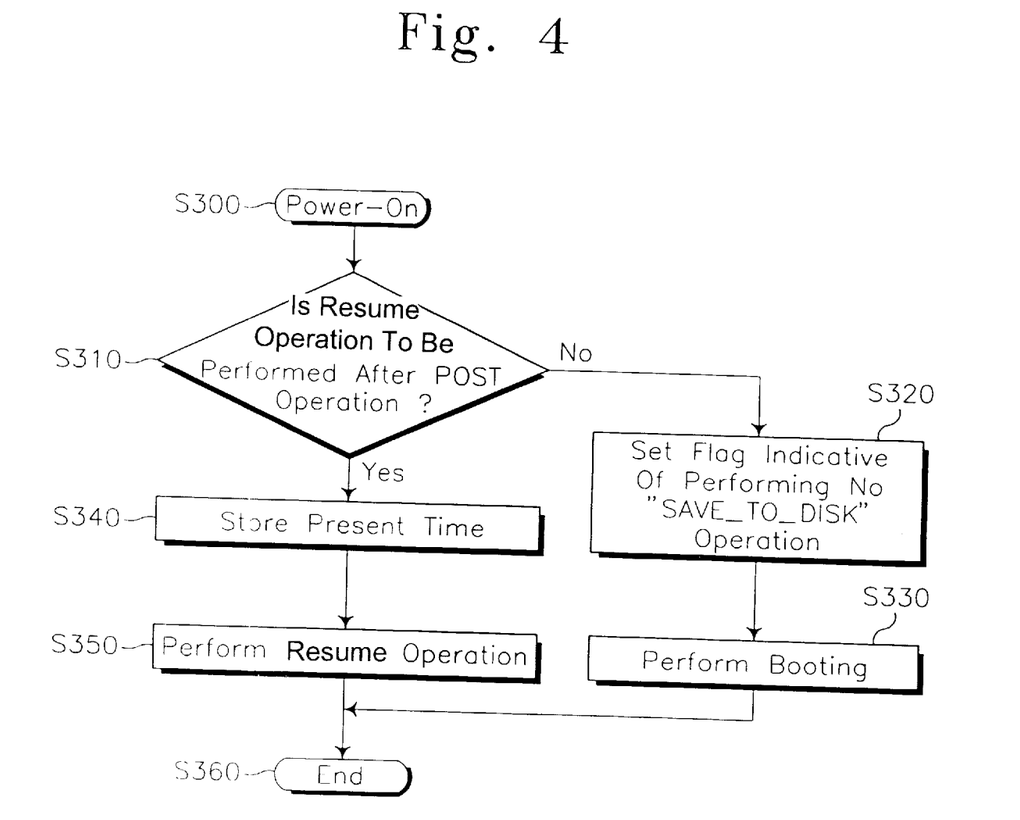
FIG. 4 is a flow chart showing control process steps of a resume operation in the computer system of FIG. 2.

Operation of the computer system according to the present invention will be described hereinafter with reference to FIGS. 2 through 4. FIG. 3 shows control process steps of the SAVE_TO_DISK operation in the computer system of FIG. 2, and FIG. 4 shows control process steps of a resume operation in the computer system of FIG. 2. The control for performing the process steps of FIGS. 3 and 4 are performed in the CPU 30.

Referring to FIG. 3, CPU 30 starts, at step S100, to perform the SAVE_TO_DISK routine upon receiving a SMI (system management interrupt) request signal from microcomputer 20. Then, in step S110 it is determined whether or not the SMI request signal is an interrupt signal for performing the SAVE_TO_DISK operation. If not, the control proceeds to step S120 wherein an SMI process routine corresponding to the SMI request signal is performed and in step S130 CPU returns to the operation being performed prior to receiving the SMI request signal. If it is determined that the SMI request signal is an interrupt signal for performing the SAVE_TO_DISK operation, the control proceeds to step S140.

At step S140, it is determined whether or not an APM (advance power management) function is supported by an operating system loaded to the computer system. If not, the control proceeds to step S150 wherein the SAVE_TO_DISK operation is performed. At this time, a flag signal indicative of the completion of the SAVE_TO_DISK operation is stored in flag storage region 82, and then, following the completion of step S150, the routine is terminated at step S160. If it is determined at step S140 that the APM function is supported by the operating system loaded to the computer system, the control proceeds to step S170 wherein it is determined whether or not the SAVE_TO_DISK operation has been performed by checking for a stored flag in flag storage region 82.

At step S170, if the flag in flag storage region 82 indicates that the SAVE_TO_DISK operation has not ever been performed, the control proceeds to step S150 so as to perform the SAVE_TO_DISK operation. If it is determined at step S170 that the SAVE_TO_DISK operation has been performed, the control proceeds to step S180 wherein it is determined whether or not a preset time, e.g., 30 seconds, has elapsed by comparing a present time with the resume starting time stored in resume time storage region 84. If the preset time has elapsed, the control proceeds to step S150 so as to perform the SAVE_TO_DISK operation, and if not, the control proceeds to step S190 wherein CPU 30 clears the SMI request signal. Accordingly, a second SAVE_TO_DISK operation cannot be performed until after the preset time has elapsed for performing a resume operation in response to a first SAVE_TO_DISK operation, thus time is provided to ensure that the resume operation is completed. That is, in step S180, whether a power saving operation can be performed is determined by referring to the stored resume starting time as compared to the present time to determine if a preset time has elapsed. If the preset time has not elapsed, then that means that a resume operation hasn't been completed in response to an earlier power saving operation (determined at step S170), thus a second power saving operation cannot be performed and the process then performs step S190. After the SMI request signal is cleared in step S190, the SMI process routine is not performed even though a new SMI request signal may be generated from microcomputer 20. Then the control proceeds to step S200, wherein a beep tone is generated so as to warn a user not to complete the resume operation and CPU 30 returns, at step S210, to the operation for receiving the SMI request signal, thus the operation, i.e., a resume operation, being performed prior to receiving the SMI request signal continues to be performed. Accordingly, a normal resume operation can be completed.

Hereinafter, the resume operation performed in the computer system of FIG. 2 will be described with reference to FIG. 4. The resume operation starts upon the power-on switch (not shown) being switched on.

Referring to FIG. 4, when a power-on signal is generated from the power-on switch at step S300, the control proceeds to step S310 wherein it is determined whether or not the resume operation is to be performed after a power-on self-test (POST) operation. For example, if the power-on state is determined not to be a normal power-on state, i.e., if the computer system is automatically powered off after the SAVE_TO_DISK operation, the CPU 30 checks a flag stored in flag storage region 82 and determines whether the power-on state is a state for performing the resume operation. Herein, the normal power-on state means that the computer system was normally powered off without performing of the SAVE_TO_DISK operation and then again powered on, thus by checking flag storage region 82 a determination can be made as to whether the power was turned on after a normal power off step or after the SAVE_TO_DISK operation.

At step S310, if it is determined that the resume operation is not to be performed, i.e., a normal power-on state was performed, the control proceeds to step S320 wherein a flag signal indicating that the SAVE_TO_DISK operation has not been performed is stored in flag storage region 82. At this time, the control proceeds to step S330 so as to perform a normal booting operation of the computer system.

At step S310, if it is determined that the resume operation is to be performed, the control proceeds to step S340 wherein information related to the present time is stored in resume time storage region 84. The control then proceeds to step S350, wherein the resume operation is performed, and then the resume operation is ended at step S360.

As described above, a computer system according to the present invention determines whether or not a resume operation is presently performed during the generation of SMI request signal for SAVE_TO_DISK operation, and if so, makes the SMI request signal clear so as to enable the SAVE_TO_DISK operation not to be performed. Therefore, the computer system is neither halted nor abnormally operated no matter when a resume or SAVE_TO_DISK operation is carried out.

What is claimed is:

1. A method of operating a computer system with a suspend function and resume function, comprising the steps of:

determining, after a power-on-self-test, whether a resume operation is to be performed;

storing, in a memory, a present time as a resume starting time, when it is determined that the resume operation is to be performed;

performing the resume operation after storing the present time;

detecting a system management interrupt (SMI) request signal;

determining whether said SMI request signal is an interrupt signal for performing a power saving operation;

performing an operation corresponding to said SMI request signal, when it is determined that said SMI request signal is not said interrupt signal for performing a power saving operation;

determining whether an operating system of said computer system supports an advanced power management function, when it is determined that said SMI request signal is said interrupt signal for performing a power saving operation;

performing said power saving operation by storing a plurality of register information of said computer system to an auxiliary storage device, when it is determined that said advanced power management function is not supported by said operating system;

checking a flag storage area of said memory to determine whether a previous power saving operation has been performed, when it is determined that said advanced power management function is supported by said operating system;

comparing a current time to said resume starting time to determine whether a preset time period has elapsed, when it is determined that said previous power saving operation has been performed;

performing said power saving operation by storing said plurality of register information of said computer system to said auxiliary storage device, when it is determined that said preset time period has elapsed; and clearing said SMI request signal so as not to perform said power saving operation, when it is determined that said preset time period has not elapsed.

2. The method as set forth in claim 1, further comprising the steps of:

storing a flag signal, indicating that a power saving operation has not been performed, in said flag storage area, when it is determined that said resume operation is not to be performed; and performing a normal booting operation of said computer system after storing said flag signal indicating that a power saving operation has not been performed.

3. The method as set forth in claim 1, wherein said step of determining whether a resume operation is to be performed comprises checking said flag storage to determine whether a power saving operation was performed.

4. The method as set forth in claim 1, further comprising a step of performing said power saving operation by storing said plurality of register information of said computer system to said auxiliary storage device, when said step of checking said flag storage area detennines that said previous power saving operation has not been performed.

5. The method as set forth in claim 1, wherein said preset time is thirty seconds.

6. The method as set forth in claim 1, further comprising a step of storing, in said flag storage area, a flag signal indicating that said step of performing said power saving operation has been completed after storing said plurality of register information of said computer system to said auxiliary storage device.

7. The method as set forth in claim 1, further comprising a step of generating a peep tone after clearing said SMI request signal.

8. A method of operating a computer system with a power saving operation for storing a plurality of register information of said computer system to an auxiliary storage device in a suspend mode, comprising the steps of:

detecting a system management interrupt (SMI) request signal;

determining whether said SMI request signal is an interrupt signal for performing said power saving operation;

performing an interrupt operation corresponding to said SMI request signal, when it is determined that said SMI request signal is not said interrupt signal for performing said power saving operation;

determining whether an operating system of said computer system supports an advanced power management function, when it is determined that said SMI request signal is said interrupt signal for performing said power saving operation;

performing said power saving operation, when it is determined that said advanced power management function is not supported by said operating system;

checking a flag storage area of said memory to determine whether a previous power saving operation has been performed, when it is determined that said advanced power management function is supported by said operating system;

determining whether a preset time period has elapsed, when it is determined that said previous power saving operation has been performed;

performing said power saving operation, when it is determined that said preset time period has elapsed;

storing, in said flag storage area, a flag signal indicating that said step of performing said power saving operation has been completed after storing said plurality of register information of said computer system to said auxiliary storage device; and clearing said SMI request signal so as not to perform said power saving operation, when it is determined that said preset time period has not elapsed.

9. The method as set forth in claim 8, further comprising the steps of:

determining, after a power-on-self-test, whether a resume operation is to be performed;

storing, in a memory, a present time as a resume starting time, when it is determined that the resume operation is to be performed;

performing said resume operation after storing the present time.

10. The method as set forth in claim 9, further comprising the steps of:

storing a flag signal, indicating that a power saving operation has not been performed, in said flag storage area, when it is determined that said resume operation is not to be performed; and performing a normal booting operation of said computer system after storing said flag signal indicating that a power saving operation has not been performed.

11. The method as set forth in claim 10, wherein said step of determining whether a preset time period has elapsed comprises comparing a current time to said resume starting time.

12. The method as set forth in claim 9, wherein said step of determining whether a preset time period has elapsed comprises comparing a current time to said resume starting time.

13. The method as set forth in claim 8, further comprising a step of performing said power saving operation, when said step of checking said flag storage area determines that said previous power saving operation has not been performed.

14. The method as set forth in claim 8, further comprising a step of generating a peep tone after clearing said SMI request signal.

15. A computer system with a power saving operation for storing a plurality of register information of said computer system to an auxiliary storage device in a suspend mode, comprising:

a power supply for distributing power from an AC adapter or a battery to respective components of the computer system;

a microcomputer for controlling said power supply in response to a power-on signal from a power-on switch and enabling power from said power supply to be supplied to said respective components of said computer system;

a central processing unit for controlling operations of said computer system;

a BIOS storage memory;

an auxiliary storage device for storing data; and a CMOS memory, said CMOS memory comprising a flag storage region which is used to determine whether or not a power saving operation is completely performed, and a resume time storage region for storing information related to a resume starting time indicating when a resume operation starts.

16. The computer system as set forth in claim 15, wherein said microcomputer generates system management interrupt (SMI) request signals used by said central processing unit to manage said computer system, wherein one of said SMI request signals is an interrupt signal for performing a power saving operation for storing a plurality of register information of said computer system to said auxiliary storage device in a suspend mode of a power management function of said computer system.

17. The computer system as set forth in claim 16, wherein said central processing unit detects said SMI request signal and determines whether said SMI request signal is said interrupt signal for performing said power saving operation, and, when it is determined that said SMI request signal is not said interrupt signal for performing said power saving operation, said central processing unit performs an interrupt operation corresponding to said SMI request signal.

18. The computer system as set forth in claim 17, wherein said central processing unit determines whether an operating system of said computer system supports an advanced power management function, when it is determined that said SMI request signal is said interrupt signal for performing said power saving operation, and when it is determined that said advanced power management function is not supported by said operating system, performs said power saving operation.

19. The computer system as set forth in claim 18, wherein said central processing unit checks said flag storage area of said CMOS memory to determine whether a previous power saving operation has been performed, when it is determined that said advanced power management function is supported by said operating system, and, when it is determined that said previous power saving operation has been performed, determines whether a preset time period has elapsed;

said central processing unit performing said power saving operation, when it is determined that said preset time period has elapsed, and stores, in said flag storage area, a flag signal indicating that said power saving operation has been completed.

20. The computer system as set forth in claim 19, wherein said central processing unit compares a present time to said resume starting time to determine whether said preset time period has elapsed.

21. The computer system as set forth in claim 19, further comprising:

said central processing unit determining, after a power-on-self-test, whether a resume operation is to be performed, and, when it is determined that the resume operation is to be performed, storing a current time as said resume starting time and then performing said resume operation; and said central processing unit storing a flag signal, indicating that a power saving operation has not been performed, in said flag storage area, when it is determined that said resume operation is not to be performed, and performing a normal booting operation of said computer system after storing said flag signal indicating that a power saving operation has not been performed.

* * * * *